United States Patent

Week et al.

[15] 3,641,879
[45] Feb. 15, 1972

[54] CENTRAL HYDRAULIC SYSTEM FOR A VEHICLE

[72] Inventors: Nils P. Week, Allen Park; Paul D. Stevenson, Ann Arbor, both of Mich.

[73] Assignee: General Motors Corporation, Detroit, Mich.

[22] Filed: Apr. 16, 1970

[21] Appl. No.: 29,090

[52] U.S. Cl. ............................................. 91/412, 60/52 S
[51] Int. Cl. ................................................. F15b 11/16
[58] Field of Search ............... 60/52 S; 91/412; 74/843, 867

[56] References Cited

UNITED STATES PATENTS

| | | | |
|---|---|---|---|
| 3,073,123 | 1/1963 | Hodgson et al. | 60/53 |
| 3,197,960 | 8/1965 | Förster | 60/52 S |
| 3,321,056 | 5/1967 | Winchell et al. | 192/85 |
| 3,470,693 | 10/1969 | Bookout et al. | 60/52 S |

*Primary Examiner*—Edgar W. Geoghegan
*Attorney*—W. E. Finken, A. M. Heiter and R. L. Phillips

[57] ABSTRACT

In a vehicle having an automatic transmission and power steering, there is provided a central hydraulic system wherein the power steering and transmission control systems are connected in series to receive the fluid from a single pump when pump flow is low and are connected in parallel to receive fluid from the pump when pump flow is high.

5 Claims, 1 Drawing Figure

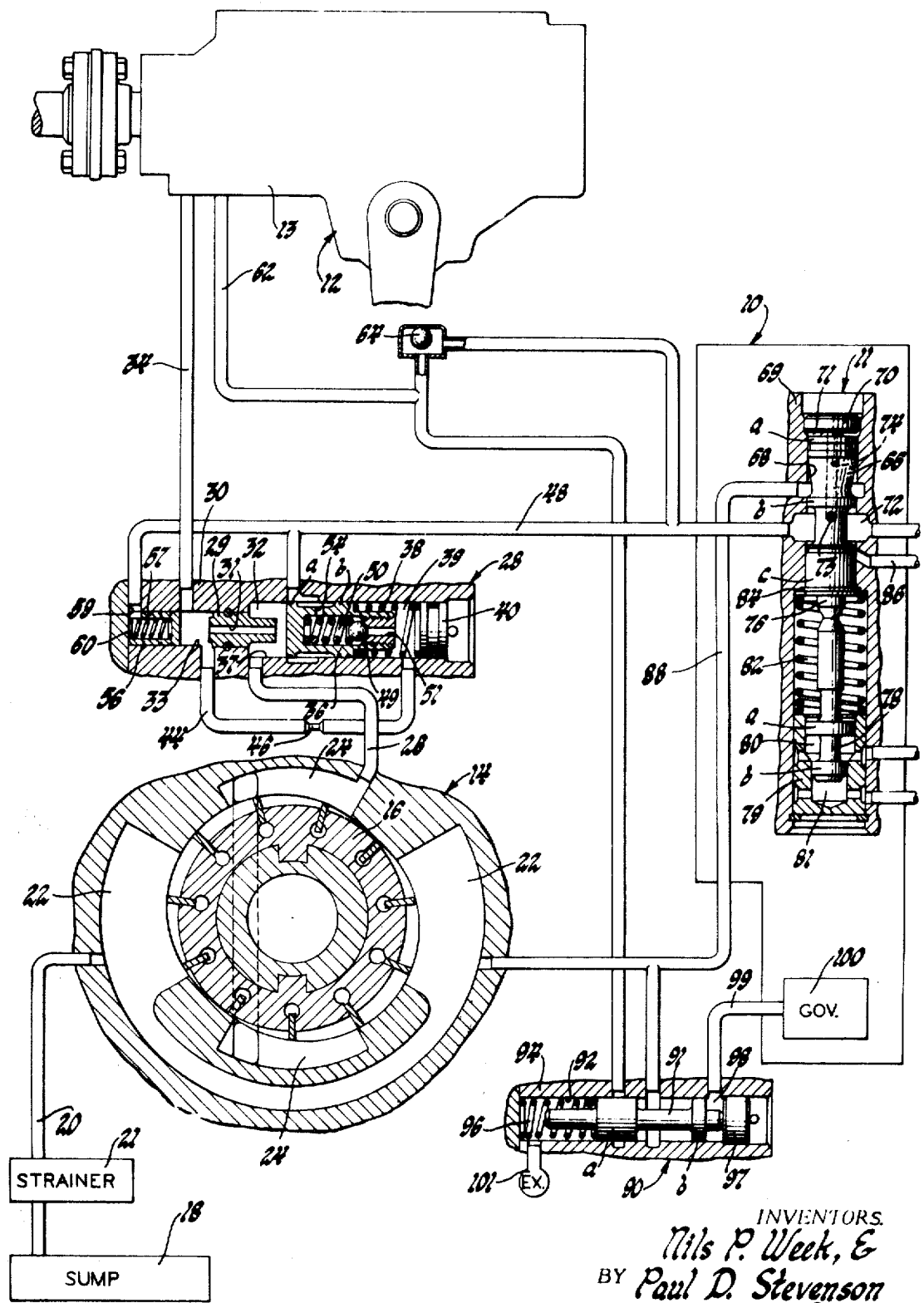

CENTRAL HYDRAULIC SYSTEM FOR A VEHICLE

This invention relates to central hydraulic systems for vehicles and more particularly to such systems for vehicles having both power steering and an automatic transmission.

It is present commercial practice in a vehicle to have one engine-driven pump supply fluid to an automatic transmission control system and another engine-driven pump supply fluid to a power steering system. In attempting to simplify the vehicle's hydraulic circuits by combining them so that they can be supplied by a single pump, I have found that it is possible to use a pump having a capacity smaller than the combined capacity of the two pumps it replaces.

The central hydraulic system according to the present invention efficiently employs a single pump that supplies fluid to both the power steering system and the automatic transmission's control system. When this pump's operating capacity is low which occurs at low engine speeds, a switching valve operates to condition the power steering system and transmission control system in series with the pump with the latter system connected downstream of the former system. The amount of flow to the power steering system is controlled by a flow control valve which bypasses excess fluid directly to the transmission control system. When pump operating capacity becomes high enough to deliver sufficient supply to the power steering and transmission control systems independently, the switching valve conditions these systems so that they are then connected in parallel to the pump with the transmission control system supplied entirely by excess fluid from the flow control valve. The circuit change from series to parallel provided by the switchover valve is controlled by a signal that indicates the pump's operating capacity which signal may be provided by transmission governor pressure.

An object of the present invention is to provide a new and improved central hydraulic system for a vehicle.

Another object is to provide a central hydraulic system for a vehicle having a power steering system and a transmission control system wherein these systems are connected to receive flow in series when the amount of fluid supply is low and are connected in parallel to receive flow when the fluid supply is high.

Another object is to provide in a central hydraulic system for a vehicle having a power steering system and an automatic transmission control system a flow control valve that controls the amount of flow to the power steering whereafter such flow is all directed to the transmission control system with any excess fluid from the flow control valve also being directed to the transmission control system and on increased pumping capacity the fluid from the power steering system is returned directly to the pump while the transmission control system is then supplied entirely by excess fluid bypassed by the flow control valve.

These and other objects of the present invention will become more apparent from the following description and drawing which diagrammatically shows an embodiment of the central hydraulic system according to the present invention.

The central hydraulic system according to the present invention is illustrated incorporated in a vehicle having an automatic transmission including a control system therefor which is generally indicated at 10 and has a pressure regulator valve 11. The automatic transmission and control system therefor including the pressure regulator valve 11 may be of the type disclosed in U.S. Pat. No. 3,321,056 granted May 23, 1967, to Winchell et al. and entitled "Transmission and Control System." The vehicle further has a power steering gear which is generally indicated at 12 and includes a power steering system 13. The power steering system may be of the type disclosed in U.S. Pat. No. 3,022,722 granted Feb. 27, 1962, to Philip B. Zeigler et al. and entitled "Rotary Power Steering Valve with Torsion Bar Centering."

Hydraulic fluid such as oil used in the central hydraulic system is supplied under pressure by a positive displacement type pump 14 which may be of the vane type shown and of any appropriate design. The pump's rotor 16 is driven by the vehicle's engine by a pump drive such as that disclosed in the aforementioned Winchell et al. patent and on such operation, draws fluid from a sump 18 through a pump delivery passage 20 which directs it through a strainer 21 prior to delivery to the pump's twin intake chambers 22. Fluid from intake chambers 22 is discharged by the pumping action to twin discharge chambers 24 from which the fluid is delivered via a passage 26 to a flow control valve 28.

The flow control valve 28 which controls the amount of flow to the power steering and bypasses excess fluid to the transmission comprises a cylindrically shaped flow control element 29 that is fixed in valve body 30 and has a central passage 31 that provides a flow-restrictive connection between expansible chambers 32 and 33. Chamber 33 is connected to a power steering delivery passage 34 that is connected to deliver the fluid passing through the flow-restrictive passage 31 to the power steering system 13. A bypass spool valve element 36 having lands $a$ and $b$ of equal diameter is located in bore 37 of the valve body with the end of land $a$ forming part of chamber 32. A spring 38 located in a chamber 39 that is closed by a plug 40 urges the valve element 36 leftward with such leftward movement being limited by the valve element abutting the right end of the flow control element 29. A passage 44 connects chamber 33 and thus the downstream side of flow-restrictive passage 31 to chamber 39 so that pressure downstream of passage 31 which pressure is power steering pressure is made available to act leftward on valve element 36 and thus to oppose the pump pressure acting in chamber 32 rightward on this valve element. A flow restriction 46 is provided in passage 44 for damping the movement of valve element 36. The flow-restrictive passage 31, which may also be called a flow control orifice, provides restriction to flow with the result that a pressure differential will occur thereacross and thus across valve element 36 to urge this valve element rightward against the bias of spring 38. When this differential pressure is large enough to move the valve element 36 sufficiently rightward as described in more detail later, the pump discharge passage 26 is connected past land $a$ to a passage 48 that supplies main pressure for the transmission control system. Power steering system pressure relief is provided by a ball check valve that is located within the bypass valve element 36 and comprises a ball 49. Ball 49 is normally biased by a spring 50 to close a passage 51 to block chamber 39 from a radial port 54 that is continuously open between lands $a$ and $b$ to the transmission main pressure passage 48. When power steering system pressure acting in chamber 39 is sufficient to move ball 49 off its seat, fluid from chamber 39 flows through passage 51 and ports 54 to passage 48. This causes a pressure drop across orifice 46 so that the valve element 36 is acted on by an increased pressure differential resulting in increased bypass flow past land $a$ to passage 48 for the pressure relief.

The flow control valve 28 further includes a pressure balance valve element 56 that is located in bore 57 of the valve body and forms part of chamber 33. The left-hand end of bore 57 is closed to provide a chamber 59 that is connected to the transmission main pressure passage 48. Pressure in chamber 33 normally holds the valve element 56 in the position shown against the bias of a spring 60 and the pressure in chamber 59 derived from the transmission main pressure passage 48. When the rightward bias is sufficient to move the valve element 56 rightward it then acts to close off the opening of chamber 33 to passage 34 to restrict flow to the power steering system as described in more detail later.

All of the fluid supplied to the power steering system is directed after power steering use to a power steering discharge passage 62. Fluid in passage 62 may be either returned to the pump's intake chambers 22 as described in more detail later or may be delivered by a ball check valve 64 to the transmission main pressure passage 48.

The pressure of the fluid in the transmission main pressure passage 48 is regulated by the pressure regulator valve 11. The pressure regulator valve 11 comprises a spool valve element 66 having three spaced lands $a$, $b$ and $c$ of equal diameter located in a bore 68 of valve body 69. A plug 70 located in the upper end of bore 68 limits upward travel of valve element 66 and also closes this bore at this end to provide a chamber 71. The transmission main pressure passage 48 is continuously connected through the valve body 69 to deliver fluid at regulated pressure to the remainder of the transmission control system which exhausts the fluid after use to sump 18. Passage 48 is also connected to an annular port 72 which is continuously open to the area on valve element 66 between lands *b* and *c*. Chamber 71 is continuously connected to this same area between lands *b* and *c* through a radial flow restrictive passage 73 and an axially extending central passage 74 in valve element 66.

At the other end of valve element 66 there is an integral axially extending stem 76 contactable with a pressure boost piston 78 which is mounted in a cylinder 79 that is retained in the valve body. The piston 78 has lands *a* and *b* of unequal diameter which cooperate with cylinder 79 to form chambers 80 and 81. When either one of these chambers is supplied with fluid pressure there is provided a boost in the regulated pressure. Valve element 66 is normally biased to the position shown by a spring 82 mounted between the annular end of cylinder 79 and a spring seat 84 abutting a shoulder on valve element 66.

With valve element 66 biased to the position shown by spring 82 and on pressure buildup in passage 48 and thus between lands *b* and *c*, this pressure is delivered to chamber 71. The pressure in chamber 71 urges downward movement of valve element 66 against the spring bias to regulate pressure in the main pressure passage 48 at a low value determined by the spring bias with the overage being exhausted first between lands *b* and *c* to a converter feed passage 86 and then between lands *a* and *b* to a pump return passage 88 which is continuously connected to deliver fluid to intake chambers 22 of pump 14. The converter feed passage 86 delivers fluid to the transmission's torque converter such as disclosed in the aforementioned Winchell et al. patent whereafter the fluid is then returned to sump 18. The above-described main pressure regulation assumes that only spring 82 is determining the main pressure. When the transmission control system is conditioned to establish certain drives such as disclosed in the aforementioned Winchell et al. patent, fluid pressure is also delivered to either chamber 80 or 81 where it acts upward on piston 78 to assist the spring 82 and thereby increase the regulated pressure in transmission main pressure passage 48. For a more detailed description of the regulator valve 11, reference may be made to the aforementioned Winchell et al. patent.

A switching valve 90 provides for switching the power steering system and the transmission control system between series and parallel connections to the pump 14. The switching valve 90 comprises a valve element 91 having spaced lands *a* and *b* of equal diameter located in a bore 92 of valve body 94. A spring 96 normally biases valve element 91 to the position shown against a plug 97 where land *a* blocks power steering discharge passage 62 from pump return passage 88. This valve position may be called the series position since it determines a series connection between the power steering system and the transmission control system. Plug 97 closes the right end of bore 92 to provide a chamber 98 that is connected to a passage 99 that is supplied with governor pressure by a governor 100. Governor 100 may be of the type shown in the aforementioned Winchell et al. patent and operates using fluid from main pressure passage 48 to provide a governor pressure in passage 99 and thus in chamber 98 that increases with increasing vehicle speed. When governor pressure acting on land *b* is sufficient to overcome the bias of spring 96, the valve element 91 is moved leftward to connect the power steering discharge passage 62 between lands *a* and *b* to the pump return passage 88. This valve position may be referred to as the parallel position since it determines a parallel connection between the power steering system and transmission control system. An exhaust 101 is connected to valve bore 92 to exhaust any leakage past land *a* to the sump.

Describing now a typical operation of the central hydraulic system disclosed above, with the engine and thus pump 14 operating and the governor pressure below some predetermined value with the vehicle either stationary or moving, the switching valve 90 is retained in its series position. Flow from pump 14 is delivered to the flow control valve 28 where it passes through the flow control orifice 31 upon rightward movement of valve element by the pressure bias then acting on this valve element and is then delivered via power steering delivery passage 34 to the power steering system 13. The flow control valve 28 may be set to regulate flow to the power steering system at 2 to 3 gallons a minute, for example. At such flow rate the pressure differential developed across the flow control orifice 31 and thus across the valve element 36 is sufficient to move the valve element rightward against the bias of spring 38 to open chamber 32 to the transmission main pressure passage 48 to thus bypass the excess fluid from the pump directly to the transmission control system. All of the fluid delivered to the power steering system 13 is fed by the power steering discharge passage 62 through the check valve 64 to the transmission main pressure passage 48 since the switching valve 90 is in its series position. Since there is no leakage in the power steering system, the entire pump flow is thus made available to the transmission control system with the transmission regulator valve 11 regulating the pressure in this latter system. During such series operation, the pump pressure that is in passage 26 is equal to the sum of the pressure drops across the flow control orifice 31, the power steering system and the transmission control system and either pressure in these systems can vary without affecting the other with the back pressure in passage 62 on the power steering system being equal to the transmission main pressure. Since the pressure in chamber 33 at the flow control valve 28 is power steering supply pressure and thus always higher than the transmission main pressure in passage 48 which latter pressure is transmitted to chamber 59, the pressure differential across valve element 56 holds it leftward in the position shown against the bias of spring 60. Thus, the pressure balance valve element 56 does not operate when the power steering system and the transmission control system are connected in series to pump 14.

Recognizing that the pump capacity increases with vehicle speed, the pump capacity will be sufficient at a certain vehicle speed and thus governor pressure to supply both the power steering system and the transmission control systems independently. The switching valve 90 is calibrated so that at this certain governor pressure, the switching valve is pressure biased to its open or parallel position connecting the power steering discharge passage 62 to the pump return passage 88 and thus to the intake chambers 22 of the pump 14. Since the power steering discharge passage 62 is then exhausted, ball check valve 64 closes to block transmission main pressure passage 48 from exhausting through passage 62 and thus, the transmission control system is then supplied entirely by the excess fluid bypassed by the flow control valve 28. On the switch to the parallel connection of the power steering and transmission control systems, the pump pressure drops to whichever is the higher of the two system pressures which is normally power steering system pressure. This results in a power saving and may also provide for the pump operating more quietly.

In the thus-established parallel connection, and as long as the power steering pressure in chamber 33 exceeds the transmission main pressure in chamber 59 by an amount sufficient to offset the bias of spring 60, the flow control valve 28 operates to regulate the power steering flow between 2 and 3 gallons per minute as discussed during series operation. However, under certain transmission operating conditions the transmission control system may require a higher pressure than the power steering system which would upset the regulation of the flow control valve 28 and tend to cause the power steering flow to increase above what would normally be satisfactory supply. The pressure balance valve portion of the flow control valve 28 prevents this from occurring by its sensing of both transmission main pressure and power steering pressure. When the transmission main pressure approaches the power steering pressure, the valve element 56 moves rightward to restrict the opening of chamber 33 to the power steering delivery passage 34. This restricts the amount of fluid delivered to the power steering system to the extent that the flow is prevented from exceeding the normal regulated value. Thus, the pump pressure is always sufficiently higher than the transmission pressure to allow the flow control valve to continue to regulate in the normal manner.

Thus, the present central hydraulic system according to the present invention makes it possible to use a smaller pump than the combined capacity of two pumps that separately supply the power steering system and transmission control system. It will also be appreciated that while governor pressure has been disclosed as a signal for operating the switchover between series and parallel, it will also be understood that other appropriate signals may be utilized to provide the switchover when pump capacity becomes great enough to supply both the power steering system and transmission system independently.

The above-described embodiment is illustrative of the invention which may be modified within the scope of the appended claims.

We claim:

1. In a fluid supply system for a vehicle having an automatic transmission and also power steering, the combination of a power steering system; a transmission control system; a pump for delivering fluid under pressure; fluid passage means for operatively connecting said power steering system and said transmission control system in series, and alternatively in parallel, to receive the fluid from said pump, switching valve means in said passage means for preventing fluid flow from one of said systems to said pump when said systems are connected in series and for permitting fluid flow from said one system to said pump when said systems are connected in parallel; and check valve means in said passage means for permitting fluid flow from said one system to the other when said switching valve means prevents fluid flow from said one system to said pump and for preventing flow in the opposite direction when said switching valve means permits fluid flow from said one system to said pump.

2. In a fluid supply system for a vehicle having an automatic transmission and power steering, the combination of a pump for supplying fluid under pressure; a transmission control system that returns fluid to said pump; a power steering system; flow control valve means for providing a controlled amount of fluid delivery from said pump to said power steering system and delivering any excess fluid to said transmission control system; check valve means for permitting fluid flow from said power steering system to said transmission control system while preventing flow in the opposite direction; and switching valve means for selectively permitting and preventing fluid flow from said power steering system to said pump.

3. In a fluid supply system for a vehicle having an automatic transmission and power steering, the combination of a pump for supplying fluid under pressure; a transmission control system that returns fluid to said pump; a power steering system; flow control valve means for providing a controlled amount of fluid delivery from said pump to said power steering system and delivering any excess fluid to said transmission control system; check valve means for permitting fluid flow from said power steering system to said transmission control system while preventing flow in the opposite direction, switching valve means for selectively permitting and preventing fluid flow from said power steering system to said pump; and pressure balance valve means for maintaining the pressure of the fluid from said pump at a value higher than the pressure in said transmission control system.

4. In a fluid supply system for a vehicle having an automatic transmission and power steering, the combination of a pump for supplying fluid under pressure; a transmission control system including first passage means for delivering fluid pressure for transmission control, second passage means for returning fluid to said pump, and pressure regulator valve means for regulating fluid pressure in said first passage means and delivering any excess fluid to said second passage means; a power steering system; third passage means for delivering fluid from said pump to said power steering system; flow control valve means in said third passage means for controlling the amount of fluid delivered from said pump to said power steering system and delivering any excess fluid to said first passage means; fourth passage means for delivering fluid from said power steering system; check valve means for permitting fluid flow from said fourth passage means to said first passage means while preventing flow in the opposite direction; and switching valve means for blocking said fourth passage means from said second passage means whereby said power steering system and said transmission control system are connected in series to said pump with said transmission control system receiving excess fluid from said flow control valve means and also for connecting said fourth passage means to said second passage means whereby said power steering system and said transmission control system are connected in parallel to said pump.

5. In a fluid supply system for a vehicle having an automatic transmission and power steering, the combination of a pump for supplying fluid under pressure; a transmission control system including first passage means for delivering fluid pressure for transmission control, second passage means for returning fluid to said pump, and pressure regulator valve means for regulating fluid pressure in said first passage means and delivering any excess fluid to said second passage means; a power steering system; third passage means for delivering fluid from said pump to said power steering system; flow control valve means in said third passage means for controlling the amount of fluid delivered from said pump to said power steering system and delivering any excess fluid to said first passage means; fourth passage means for delivering fluid from said power steering system; check valve means for permitting fluid flow from said fourth passage means to said first passage means while preventing flow in the opposite direction; switching valve means for blocking said fourth passage means form said second passage means whereby said power steering system and said transmission control system are connected in series to said pump with said transmission control system receiving excess fluid from said flow control valve means and also for connecting said fourth passage means to said second passage means whereby said power steering system and said transmission control system are connected in parallel to said pump; and pressure balance valve means responsive to both the regulated pressure in said first passage means and the pressure in said third passage means for maintaining the pressure of the fluid delivered by said pump above that of the regulated pressure in said first passage means when said power steering system and said transmission control set are connected in parallel to said pump.

\* \* \* \* \*